United States Patent [19]

Yoda et al.

[11] Patent Number: 4,608,315

[45] Date of Patent: Aug. 26, 1986

[54] MAGNETIC RECORDING MEDIUM

[75] Inventors: Kuniichi Yoda; Yuji Ishihara, both of Saku; Hitoshi Azegami, Tobu, all of Japan

[73] Assignee: TDK Corporation, Tokyo, Japan

[21] Appl. No.: 723,788

[22] Filed: Apr. 16, 1985

[30] Foreign Application Priority Data

Apr. 19, 1984 [JP] Japan ................................. 59-77573

[51] Int. Cl.$^4$ ............................................. G11B 5/70
[52] U.S. Cl. ............................. 428/425.9; 252/62.54; 427/128; 428/480; 428/493; 428/521; 428/522; 428/328; 428/329; 428/694; 428/900; 360/134; 360/135; 360/136
[58] Field of Search ............... 428/694, 329, 900, 327, 428/328, 522, 425.9, 695, 480, 521, 493; 427/131, 128; 252/62.54; 360/134–136

[56] References Cited

U.S. PATENT DOCUMENTS

| | | | |
|---|---|---|---|
| 4,352,859 | 10/1982 | Yoda | 428/425.9 |
| 4,429,017 | 1/1984 | Ogawa | 428/463 |
| 4,460,653 | 7/1984 | Uzegami | 428/694 |

Primary Examiner—Ellis P. Robinson
Attorney, Agent, or Firm—Seidel, Gonda, Goldhammer & Abbott

[57] ABSTRACT

A magnetic recording medium comprising a resinous component in which magnetic particles are dispersed and a base to which the dispersion is solidly applied, the resinous component consisting of a copolymer having an OH/CH absorption ratio according to the infrared absorption spectrum of 0.2 or more and made from (A) vinyl chloride, (B) vinylidene chloride, (C) a vinyl alkylcarboxylate, (D) an other monomer copolymerizable with vinyl chloride, and (E) a saponified vinyl alkylcarboxylate, and a rubbery binder. Alternatively, a polyisocyanate is added to the above copolymer.

6 Claims, 1 Drawing Figure

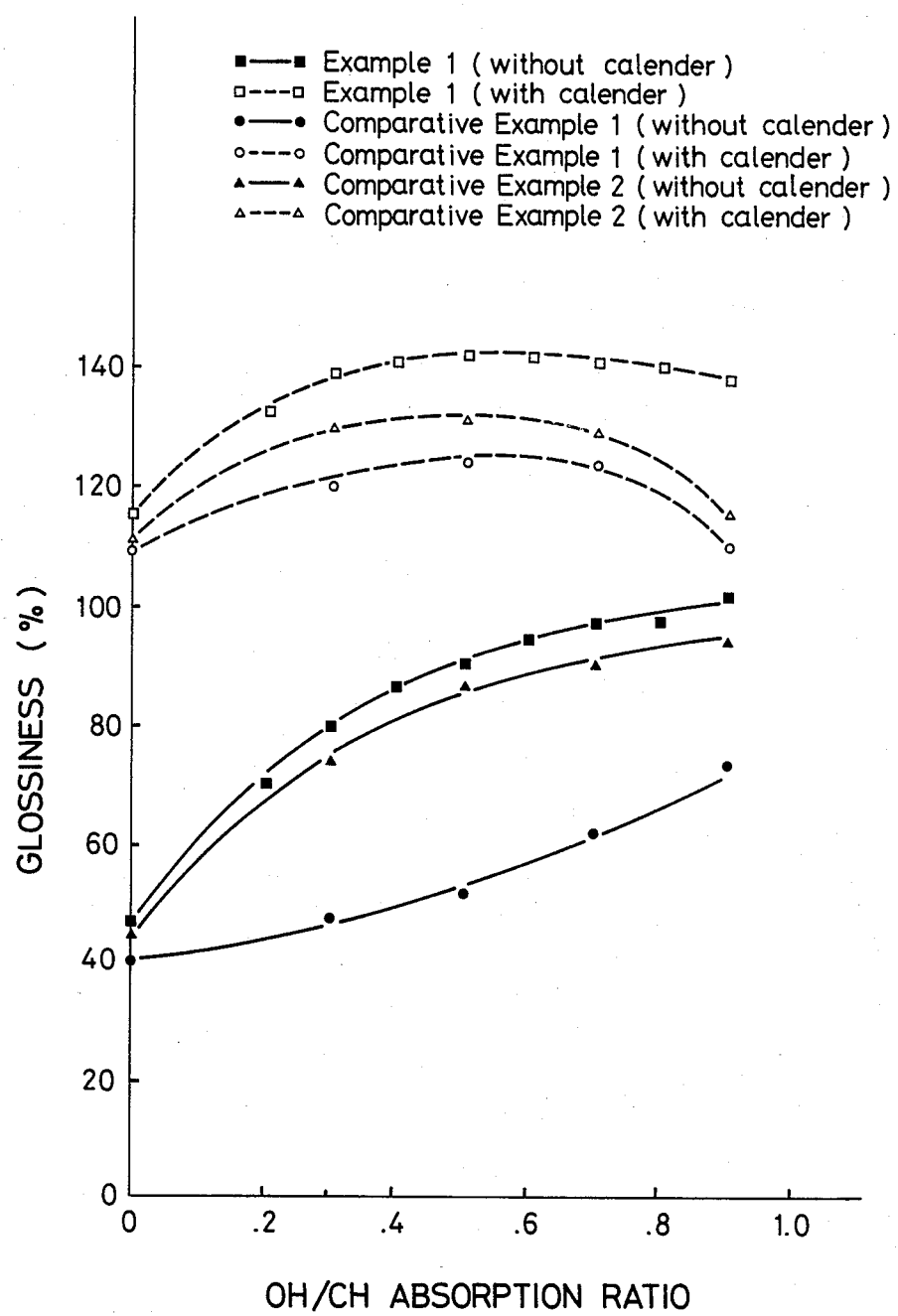

MAGNETIC RECORDING MEDIUM

BACKGROUND OF THE INVENTION

This invention relates to a magnetic recording medium in which magnetic particles are finely dispersed. More particularly, the invention is concerned with a magnetic recording medium having excellent magnetic properties and electromagnetic conversion characteristics owing to improved dispersibility of magnetic particles and, moreover, exhibiting good shelf stability and running performance in hot and humid environments.

Vinyl chloride-vinyl acetate-vinyl alcohol copolymers have been wide used as appropriate resins for magnetic tape binders that permit satisfactory dispersion of magnetic particles. The copolymers available for that purpose may well be typified by the group of products trademarked "VAGH" by Union Carbide Corp. of the United States.

Since the dispersibility of magnetic particles is improved by increasing the proportion of hydroxyl groups in the copolymers of the foregoing type, it has already been proposed to raise the OH/CH absorption ratio according to the infrared absorption spectrum to 0.7 or more (Japanese Patent Application Publication No. 3393/1981). A drawback to the proposal is that the copolymers with increased hydroxyl group contents are difficult to process on the surface because of their glass transition temperature as high as 70° C. or above and hence the resulting magnetic layer after calendering can hardly be improved in surface quality. In an effort to eliminate the drawback, the present inventors previously proposed the use as a binder resin of a blend of a vinyl chloride-vinyl acetate-vinyl alcohol copolymer with a copolymer ingredient having a glass transition point of 65° C. or below (Japanese Patent Application No. 94016/1981, etc.). Such a resinous mixture as a binder ingredient improves the coating surface properties and glossiness of the calendered surface without sacrifice of the magnetic powder dispersibility. However, the low glass transition temperature adversely affects the storability and running properties of the magnetic tapes under high-temperature, high-humidity conditions. In order to improve these properties of the tapes under the stringent conditions, the present inventors have also proposed the adoption as a binder resin of a copolymer having an OH/CH absorption ratio according to the infrared absorption spectrum of 0.2 to 0.7, the constituents of the copolymer being vinyl chloride, a vinyl alkylcarboxylate, a monomer copolymerizable with vinyl chloride, and a saponified vinyl alkylcarboxylate (Japanese Pat. App. No. 182254/1981).

In recent years, however, these resins have not always achieved satisfactory dispersion because more and more finely divided magnetic materials (having specific surface areas of at least about 30 m$^2$/g as determined by the BET method) have come into use for improvements in the S/N ratio. Emergence of a binder component capable of providing good dispersion under these conditions has therefore been eagerly awaited.

SUMMARY OF THE INVENTION

The present inventors have made intensive investigations about binder resins with the view to solving the foregoing problems. It has been found, as a result, that copolymerization of vinyl chloride, a vinyl alkylcarboxylate, a monomer copolymerizable with vinyl chloride, and a saponified vinyl alkylcarboxylate, with the addition of vinylidene chloride suppresses the boosting of the glass transition temperature without reducing the proportion of the saponified vinyl alkylcarboxylate in the resulting component, with consequent improvements in the magnetic powder dispersibility and in the glossiness after calendering, and in shelf stability and running performance at elevated temperatures and humidities. The discovery has now led to the first invention.

It has also been found that the employment of a resinous component formed by adding a polyisocyanate to the component of the first invention further improves the physical properties of the magnetic coating and gives magnetic tapes of good durability. The second invention is based on this discovery.

The present invention resides, in the first aspect, in a magnetic recording medium comprising a resinous component in which magnetic particles are dispersed and a base to which the dispersion is solidly applied, said resinous component consisting of a copolymer made from
 (A) vinyl chloride,
 (B) vinylidene chloride,
 (C) a vinyl alkylcarboxylate,
 (D) an other monomer copolymerizable with vinyl chloride, and
 (E) a saponified vinyl alkylcarboxylate,
and having an OH/CH absorption ratio of 0.2 or more and a rubbery binder.

In the second aspect, the invention resides in a magnetic recording medium comprising a resinous component in which magnetic particles are dispersed and a base to which the dispersion is solidly applied, said resinous component consisting of the above-defined copolymer, a rubbery binder, and a polyisocyanate.

BRIEF DESCRIPTION OF THE DRAWING

The single FIGURE is a graph showing the surface gloss values of calendered and uncalendered magnetic tapes according to examples of the invention and comparative examples.

DETAILED DESCRIPTION OF THE INVENTION

The copolymer for use in the present invention may be prepared by any of various known methods. One method, for example, is to obtain a copolymer containing a saponified vinyl alkylcarboxylate by partly saponifying a vinyl chloride-vinylidene chloride-vinyl alkylcarboxylate copolymer, and then add another monomer copolymerizable with vinyl chloride to effect further copolymerization.

For the present invention usable vinyl alkylcarboxylates (C) and their saponified products (E) include vinyl acetate, vinyl propionate, vinyl ester with Versatic acid (trade name: Shell Oil Co.), and saponified products thereof.

In the saponification (typically, that of a vinyl chloride-vinylidene chloride-vinyl alkylcarboxylate copolymer) it is necessary to attain an OH/CH absorption ratio according to the infrared absorption spectrum of at least 0.2 so as to inhibit to some extent the unfavorable effect upon the dispersibility of magnetic particles. In the expression OH/CH absorption ratio according to the infrared absorption spectrum as used herein, the OH absorption occurs at 3450 cm$^{-1}$ and the CH absorption at 2930 cm$^{-1}$, and the OH/CH means their intensity ratio.

Also for use in the invention, the other monomer (D) copolymerizable with vinyl chloride may, for example, be any of maleic acid, fumaric acid, methacrylic acid, their esters, and acrylic acid and its esters.

The monomers to constitute the copolymer are used in amounts, all by weight, of 50 to 85% (A) vinyl chloride, 5 to 40% (B) vinylidene chloride, 5 to 40% (C) vinyl alkylcarboxylate, 1.0 to 5.0% (D) other monomer copolymerizable with vinyl chloride, and the remainder saponified vinyl alkylcarboxylate. In any case, the sum of the amounts of (A), (B), (C), and (D) is less than 100% by weight. The saponified vinyl ester is essential for the improvement of dispersibility but too large a proportion is undesirable because it would render the running of the resulting tape instable under hot and humid conditions (for example, at a temperature exceeding 40° C. and at a humidity of 80%).

In a typical example the preparation of a copolymer for use in the present invention starts with a vinyl chloride-vinylidene chloride-vinyl acetate copolymer in one of varied compositional ratios and ends with the obtainment of a desired copolymer. In preferred examples, ternary copolymers of vinyl chloride:vinylidene chloride:vinyl acetate at varying ratios (by weight) of 80:15:5, 80:10:10, or 70:15:15 are subjected to saponification in the usual manner to form copolymers having various degrees of saponification, and then the copolymers are copolymerized with one of monomers copolymerizable with vinyl chloride to obtain copolymers of the invention.

The present invention uses a binder of the rubbery type. Combined use of a rubbery binder and a polyisocyanate gives a magnetic coating film of better physical properties and a tape of greater durability.

The rubbery binder to be used in the first invention is, desirably, polyurethane resin, acrylonitrile rubber, or their combination.

The rubbery binder desired for the second invention is polyurethane resin, polyester resin, or their combination.

Typical examples of polyurethane resins usable for the invention are those marketed under the trade designations "Nippollan 2304", "-2301", "-3022", "-5032", "-5033", and "Paraprene 22S" by Nippon Polyurethane Industry Co.; "Estane 5702", "-5703", "5711", "-5712", and "-5717" by B. F. Goodrich Chemical Co. of the United States; "Crisvon 4216", "-4407", and "-7209" by Dainippon Ink & Chemical Co.; "EA-254", "-255", "-256", "Praccel 205", "-208", "-212", "-230", "-240", "-303", "-305", "-308", "-320", and "-330" by Daicel Chemical Industries, Ltd.; "T-1040" and "E-550" by Takeda Chemical Industries, Ltd.; and "Pandex T-5000", "-T-5009", "-T-5010", "-T-5102", "-T-5205", and "-5260HT" by Dainippon Ink.

Among useful acrylonitrile rubbers are the products of Nippon Zeon Co. tradenamed "Hycar 1042", "-1052", "-1072", "-1312", "-1432", "-1043", and "-1053". In the first invention polyurethane resin and acrylonitrile rubber may be used either singly or in combination. The amount of the polyurethane resin and/or acrylonitrile rubber to be used ranges from 80 to 10%, preferably from 60 to 20%, on the basis of the total resin weight.

In the second invention a polyester resin is employed as a suitable rubbery binder besides the polyurethane resin. Examples of polyester resins which may be used for this purpose are those tradenamed "Desmophen 2200", "-1700", "-1100", "-800", and "-650" by Bayer Co.; "Nippollan 1004" and "-4032" by Nippon Polyurethane; and "Vylon 200", "-300", and "-500" by Toyobo Co. The polyester resin may be used in place of or in combination with the polyurethane resin. The amount or combined amount to be used is in the range of 80 to 10%, preferably in the range of 60 to 20%, on the basis of the total resin weight.

In the practice of the invention the use of a polyisocyanate as a binder in addition to the rubbery binder brings further impromements in the physical properties of the resulting magnetic coating film and in the tape durability.

The polyisocyanate reacts with the OH and active hydrogen groups in the copolymer and also reacts for cross-linking with the active hydrogen groups of the polyurethane and polyester to harden and reinforce the resulting magnetic coating film. The polyisocyanate for use in the present invention is added in an amount of 5 to 30%, preferably 10 to 25%, on the basis of the total resin weight. Those which may be mentioned as examples of polyisocyanates compounds usable to this end are Nippon Polyurethane's products under the trade designations "Coronate L", "-HL", "-2036", etc.

Aside from the above-mentioned copolymer and binder, various other additives may be used to improve the dispersibility, lubricity, and other properties. Usually used additives include fatty acids (myristic, palmitic, stearic, and behenic acids), silicone oil (dimethylsiloxane), antistatic agents (metallic soaps and quaternary ammonium salts), and dispersants (fatty acid esters, phosphates, sorbitan esters, and higher alcohols).

The copolymer, binder, and optionally additives are placed, together with a powdered magnetic material, into a ball mill and are thoroughly mixed together for dispersion. The mixing ratio of the magnetic powder to the binder is desired to be within the range from 5:1 to 3:1. The mixture so obtained is applied by calendering or other means to the surface of a base material and dried to form a coating film thereon.

The first magnetic recording medium of the invention obtained in this way, in which the magnetic particles are uniformly dispersed with good affinity, has excellent magnetic properties, such as eminent orientation and maximum residual flux density owing to the high degree of dispersibility. It is easily calendered for improved surface properties. With desirable electromagnetic conversion characteristics, the resulting medium moreover exhibits outstanding shelf stability and running performance in hot and humid environments.

The second magnetic recording medium of the invention possesses, in addition to the afore-mentioned advantages of the first invention, even more excellent magnetic-coating physical properties and tape durability.

The invention will now be more fully described in connection with examples thereof.

EXAMPLE 1

Composition were made of

| | |
|---|---|
| vinyl chloride-vinylidene chloride-vinyl acetate copolymer* (OH/CH absorption ratios: 0, 0.2, 0.4, 0.5, 0.6, 0.7, 0.8, 0.9) | |
| (Q'ties of maleic acid: 0, 0.5, 1.0, 1.5, 2.0, 2.5, 3.0%) | 24–36 g |
| polyurethane resin ("Nippollan #5033") | 4–16 |
| additive | 0–20 |

| magnetic powder (γ-Fe₂O₃) | 120–200 |

*Quinary copolymers each of which was prepared on the basis of a vinyl chloride:vinylidene chloride:vinyl acetate = 80:15:5 (by weight) copolymer, containing the copolymer partly saponified to one of the varying OH/CH absorption ratios according to the infrared absorption spectrum as given in the parenthesis, with further copolymerization with the monomer mentioned in the other parenthesis in one of the varied amounts. The expression "OH/CH absorption ratio = O" means that the copolymer was not saponified, and by "Q'ty of maleic acid = O" is meant that the monomer was not added (the same applying hereinafter).

$$\text{Monomer \%} = \frac{\text{Weight of monomer}}{\text{Weight of copolymer} + \text{weight of monomer}} \times 100$$

Each composition was placed in a ball mill and mixed up for 24 hours to achieve through dispersion. Magnetic coating materials thus obtained were applied to tape surfaces and dried. The magnetic tapes were then tested for their magnetic properties and electromagnetic conversion characteristics (after calendering). The results are summarized in Table 1. Glossiness too was determined according to whether the coated surface was calendered or not (when uncalendered, only as to the gravure coated surface). The results are illustrated for comparison in FIG. 1.

COMPARATIVE EXAMPLE 1

Procedure of Example 1 was repeated with the exception that the compositions were instead made of

| vinyl chloride-vinyl acetate copolymer* (OH/CH absorption ratios: 0, 0.3, 0.5, 0.7, 0.9) | 24–36 g |
| polyurethane resin ("Nippollan #5033") | 4–16 |
| additive | 0–20 |
| magnetic powder (γ-Fe₂O₃) | 120–200 |

*Copolymers each of which was prepared on the basis of a vinyl chloride:vinyl acetate = 80:20 (by weight) copolymer, containing the copolymer partly saponified to one of the varying OH/CH absorption ratios according to the infrared absorption spectrum as given in the parenthesis.

The results are shown in Table 1 and FIG. 1.

COMPARATIVE EXAMPLE 2

In following the procedure of Example 1, the compositions were replaced by those consisting of

| vinyl chloride-vinyl acetate copolymer* (OH/CH absorption ratios: 0, 0.3, 0.5, 0.7, 0.9) (Q'ties of maleic acid: 0, 0.5, 1.0, 1.5, 2.0, 2.5, 3.0%) | 16–36 g |
| polyurethane resin ("Nippollan #5033") | 4–24 |
| additive | 0–20 |
| magnetic powder (γ-Fe₂O₃) | 120–200 |

*Quaternary copolymers each of which was prepared on the basis of a vinyl chloride:vinyl acetate = 80:20 (by weight) copolymer, containing the copolymer partly saponified to one of the varying OH/CH absorption ratios according to the infrared absorption spectrum as given in the parenthesis, with further copolymerization with the monomer mentioned in the other parenthesis in one of the varied amounts.

The results are given in Table 1 and FIG. 1.

TABLE 1

| | Magnetic properties | | Electromagnetic conversion characteristics* (dB) | | | |
|---|---|---|---|---|---|---|
| | Br | Br/Bm | MOL315 Hz | MOL10 kHz | S-315 Hz | S-10 kHz |
| Example 1 | 1780 | 0.843 | +0.8 | +1.2 | +0.8 | +0.9 |
| Comparative Example 1 | 1520 | 0.802 | +0.1 | +0.3 | −0.1 | −0.2 |
| Comparative Example 2 | 1680 | 0.817 | +0.5 | +0.8 | +0.4 | +0.2 |

*As compared with the applicat's standard tape.

As is obvious from Table 1, the magnetic recording medium according to this invention attains high maximum remanent magnetic flux density through uniform dispersion of the magnetic particles. It therefore exhibits desirable MOL315 Hz and MOL-10 kHz values as electromagnetic conversion characteristics and a high S-315 Hz value reflecting good low-frequency sensitivity. In the S-10 kHz value, or high-frequency sensitivity, too, it shows a notable improvement.

FIG. 1 indicates that the surface gloss of uncalendered coating film increases in proportion to the OH/CH absorption ratio. On the other hand, the gloss of conventional calendered films (Comparative Examples 1 and 2) increases to some extent with the rise of the OH/CH absorption ratio but begins to decrease as the ratio further increases. This is ascribable to the fact that calendering becomes increasingly difficult to accomplish with the elevation of the glass transition temperature. Under the invention, by contrast, the glass transition temperature of the binder resin is kept low enough to bring no difficulty in calendering. Hence, an increase in the OH/CH absorption ratio is not accompanied with a loss of surface gloss and a higher glossiness value is obtained than with conventional coatings.

Next, comparison tests were made of magnetic tapes in respect of their shelf stability and running quality under high-temperature, high-humidity conditions as below.

EXAMPLE 2

With the exception that Coγ-Fe₂O₃ was used as the magnetic powder, the same ingredients and the same procedure as described in Example 1 were used in obtaining magnetic tapes. The tapes were placed at high temperature and humidity (50° C., 80%) for 5 days, and their wow-and-flutter values were evaluated. Also, each tape was moved 100 times, reel to reel, past heads in environments at 60° C. and RH80%, and the outage was determined. The results are shown in Table 2.

EXAMPLE 3

Magnetic tapes were made following the same procedure as in Example 1 except that the compositions used consisted of

| vinyl chloride-vinylidene chloride-vinyl acetate copolymer* (OH/CH absorption ratios: 0, 0.3, 0.5, 0.7, 0.9) (Q'ties of maleic acid: 0, 0.5, 1.0, 1.5, 2.0, 2.5, 3.0%) | 16–36 g |
| polyurethane resin ("Nippollan #2304") | 4–24 |
| additive | 0–40 |

| magnetic powder ($\gamma$-Fe$_2$O$_3$) | 120–200 |

*Quinary copolymers each of which was prepared on the basis of a vinyl chloride:-vinylidene chloride: vinyl acetate = 80:10:10 (by weight) copolymer, containing the copolymer partly saponified to one of the varying OH/CH absorption ratios according to the infrared absorption spectrum as given in the parenthesis and further copolymerized with the monomer mentioned in the other parenthesis in one of the varied amounts.

The magnetic tapes thus obtained were tested in the same way as in Example 2. The data are given in Table 2.

COMPARATIVE EXAMPLE 3

The magnetic tapes obtained in Comparative Example 1 were tested in conformity with Example 2. The data are listed in Table 2.

COMPARATIVE EXAMPLE 4

Magnetic tapes were made by repeating the procedure of Example 1 with the exception that the compositions used were

| vinyl chloride-vinyl acetate copolymer* | 8–18 g |
| (OH/CH absorption ratios: 0.3, 0.5, 0.7, 0.8, 0.9) | |
| vinyl chloride-vinyl acetate copolymer** | 8–18 |
| (Q'ties of maleic acid: 0, 0.5, 1.0, 1.5, 2.0, 2.5, 3.0%) | |
| polyurethane resin ("Nippollan #2304") | 4–24 |
| additive | 0–40 |
| magnetic powder ($\gamma$-Fe$_2$O$_3$) | 120–200 |

*Copolymers each of which was prepared on the basis of a vinyl chloride:vinyl acetate = 80:20 (by weight) copolymer, containing the copolymer partly saponified to one of the varying OH/CH absorption ratios according to the infrared absorption spectrum as given in the parenthesis.
**Vinyl chloride-vinyl acetate copolymers copolymerized with varying amounts of the monomer as in the parenthesis.

These magnetic tapes were tested by the same methods as in Example 2. Table 2 shows the data.

TABLE 2

| | Wow-and-flutter at 50° C., 80% | Running outage at 60° C., 80% |
|---|---|---|
| Example | | |
| 2 | 0.15% or less | 10–15% |
| 3 | 0.10% or less | 10% or less |
| Comparative | | |
| 3 | 0.10% or less | 10% or less |
| 4 | 0.30–0.50% | 50–80% |

EXAMPLE 4

Each of compositions consisting of

| vinyl chloride-vinylidene chloride-vinyl acetate copolymer* | 12–28 g |
| (OH/CH absorption ratios: 0, 0.3, 0.5, 0.7, 0.9) | |
| (Q'ties of maleic acid: 0, 0.5, 1.0, 1.5, 2.0, 2.5, 3.0%) | |
| polyurethane resin ("#5033") | 12–28 |
| dispersant | 0–10 |
| abrasive (alumina) | 1–10 |
| lubricant (fatty acids) | 1–20 |
| polyisocyanate ("Coronate L") | 4–20 |
| carbon | 6–12 |
| magnetic powder (Co$\gamma$-Fe$_2$O$_3$) | 120–200 |

*Quinary copolymers each of which was prepared on the basis of a vinyl chloride:-vinylidene chloride:vinyl acetate = 80:10:10 (by weight) copolymer, containing the copolymer partly saponified to one of the varying OH/CH absorption ratios accordingto the infrared absorption spectrum as given in the parenthesis and further copolymerized with the monomer mentioned in the other parenthesis in one of the varied amounts.

was placed in a ball mill and mixed up for 24 hours for thorough dispersion. Each magnetic coating material thus prepared was applied on a 14 $\mu$-thick polyester film, the coat was surface finished and cured at about 60° C. for 24 hours, and then the coated film was slitted into ribbons ½ inch (1.8 cm) wide. The magnetic tapes so obtained were tested for magnetic properties, surface gloss, R.F.OUT, Y-S/N, C-S/N AM, and tape durability. The data are given in Table 3.

EXAMPLE 5

Magnetic tapes were obtained by the procedure of Example 4 except that the compositions used consisted of

| vinyl chloride-vinylidene chloride-vinyl acetate copolymer* | 12–28 g |
| (OH/CH absorption ratios: 0, 0.3, 0.5, 0.7, 0.9) | |
| (Q'ties of fumaric acid: 0, 0.5, 1.0, 1.5, 2.0, 2.5, 3.0%) | |
| polyurethane resin ("Takeda T-550") | 12–28 |
| dispersant | 0–10 |
| lubricant (fatty acid) | 1–10 |
| abrasive (alumina) | 1–10 |
| polyisocyanate ("Coronate L") | 4–20 |
| carbon | 6–12 |
| magnetic powder (Co$\gamma$-Fe$_2$O$_3$) | 120–200 |

*Quinary copolymers each of which was prepared on the basis of a vinyl chloride:-vinylidene chloride:vinyl acetate = 80:10:10 (by weight) copolymer, containing the copolymer partly saponified to one of the varying OH/CH absorption ratios accordingto the infrared absorption spectrum as given in the parenthesis and further copolymerized with the monomer mentioned in the other parenthesis in one of the varied amounts.

The resulting magnetic tapes were tested in the same manner as described in Example 4. The data appear in Table 3.

COMPARATIVE EXAMPLE 5

Magnetic tapes were made by the same procedure as in Example 4 with the exception that the compositions consists of

| vinyl chloride-vinyl acetate copolymer* | 12–28 g |
| (OH/CH absorption ratios: 0, 0.3, 0.5, 0.7, 0.9) | |
| polyurethane resin ("#5033") | 12–28 |
| dispersant | 0–10 |
| abrasive (alumina) | 1–10 |
| lubricant (fatty acid) | 1–20 |
| carbon | 6–12 |
| polyisocyanate ("Coronate L") | 4–20 |
| magnetic powder (Co$\gamma$-Fe$_2$O$_3$) | 120–200 |

*Copolymers each of which was prepared on the basis of a vinyl chloride:vinyl acetate = 80:20 (by weight) copolymer, containing the copolymer partly saponified to one of the varying OH/CH absorption ratios according to the infrared absorption spectrum as given in the parenthesis.

The magnetic tapes were tested by the same methods as in Example 4. The data are shown in Table 3.

COMPARATIVE EXAMPLE 6

Magnetic tapes were obtained by the procedure of Example 4 excepting that the compositions used consisted of

| vinyl chloride-vinyl acetate copolymer* | 12–28 g |
| (Q'ties of monomer (maleic acid): 0, 0.5, 1.0, 1.5, 2.0, 2.5, 3.0%) | |
| polyester resin ("#4032") | 12–28 |
| dispersant | 0–10 |
| lubricant | 1–20 |
| abrasive (alumina) | 1–10 |
| carbon | 6–12 |
| polyisocyanate ("Coronate L") | 4–20 |

-continued

| | |
|---|---|
| magnetic powder (Coγ-Fe₂O₃) | 120–200 |

*The vinyl chloride-vinyl acetate copolymer was further copolymerized with the monomer in varying amounts as given in the parenthesis.

Tests were conducted with these magnetic tapes in the same way as in Example 4. Table 3 gives the data.

COMPARATIVE EXAMPLE 7

Magnetic tapes were made by the same procedure as in Example 4 with the exception that the compositions consisted of

| | |
|---|---|
| vinyl chloride-vinyl acetate copolymer* (OH/CH absorption ratios: 0, 0.3, 0.5, 0.7, 0.9) (Q'ties of monomer (maleic acid): 0, 0.5, 1.0, 1.5, 2.0, 2.5, 3.0%) | 12–28 g |
| polyester resin ("#4032") | 12–28 |
| dispersant | 0–10 |
| lubricant | 1–20 |
| abrasive (alumina) | 1–10 |
| carbon | 6–12 |
| polyisocyanate ("Coronate L") | 4–20 |
| magnetic powder (Coγ-Fe₂O₃) | 120–200 |

*Quaternary copolymers each of which was prepared on the basis of a vinyl chloride:vinyl acetate = 80:20 (by weight) copolymer, containing the copolymer partly saponified to one of the varying OH/CH absorption ratios according to the infrared absorption spectrum as given in the parenthesis and further copolymerized with the monomer mentioned in the other parenthesis in one of the varied amounts.

They were tested by the methods of Example 4. Table 3 shows the data.

TABLE 3

| | Magnetic properties | | Glossi- ness, % | RF.OUT 5 MHz, dB | Y-S/N dB | C-S/N AM, dB | Tape dur- ability* |
|---|---|---|---|---|---|---|---|
| | Br | Br/Bm | | | | | |
| Example | | | | | | | |
| 4 | 1270 | 0.785 | 142 | +1.0 | +1.3 | +1.6 | Good |
| 5 | 1250 | 0.780 | 140 | +0.9 | +1.2 | +1.5 | Good |
| Comparative | | | | | | | |
| 5 | 1050 | 0.750 | 127 | +0.0 | +0.2 | +0.5 | Good |
| 6 | 1050 | 0.750 | 131 | +0.1 | +0.3 | +0.8 | Poor |
| 7 | 1130 | 0.760 | 134 | +0.5 | +0.7 | +1.1 | Good |

*Judged by the conditions of tape damage and head clogging upon a running test of 100 passes on a video tape recorder under conditions of 40° C. and RH 80%.

As will be understood from Table 3, the magnetic tapes obtained in accordance with the present invention are improved in magnetic properties and surface glass of the magnetic coating films owing to enhanced magnetic powder dispersibility. Furthermore, the magnetic tapes of the invention are superior in tape durability as well as in physical properties of the magnetic coatings.

Although the present invention has been illustrated as using γ-Fe₂O₃ or Co-coated γ-Fe₂O₃ as the magnetic powder, it is to be noted that the invention is not limited thereto but other magnetic powders including Fe₃O₄, Co-coated Fe₃O₄, other similar alloys and the like may be employed as well. Also, additives (dispersants and lubricants) in common use may also be used under the invention.

What is claimed is:

1. A magnetic recording medium comprising a resinous component in which magnetic particles are dispersed and a base to which the dispersion is solidly applied, said resinous component comprising a copolymer having an OH/CH absorption ratio according to the infrared absorption spectrum of 0.2 or more and made from
   (A) vinyl chloride,
   (B) vinylidene chloride,
   (C) a vinyl alkylcarboxylate,
   (D) an other monomer copolymerizable with vinyl chloride, and
   (E) a saponified vinyl alkylcarboxylate,
   and a rubbery binder.

2. A magnetic recording medium according to claim 1 wherein said copolymer is made, on the basis of the copolymer weight, from
   (A) 50 to 85% vinyl chloride,
   (B) 5 to 40% vinylidene chloride,
   (C) 5 to 40% vinyl alkylcarboxylate,
   (D) 1.0 to 5.0% other monomer copolymerizable with vinyl chloride, and
   (E) the balance of saponified vinyl ester of alkyl carboxylic acid, all by weight.

3. A magnetic recording medium according to claim 1 or 2 wherein said rubbery binder is acrylonitrile rubber, polyurethane resin, or a combination thereof.

4. A magnetic recording medium comprising a resinous component in which magnetic particles are dispersed and a base to which the dispersion is solidly applied, said resinous component comprising a copolymer having an OH/CH absorption ratio according to the infrared absorption spectrum of 0.2 or more and made from
   (A) vinyl chloride,
   (B) vinylidene chloride,
   (C) a vinyl alkylcarboxylate,
   (D) an other monomer copolymerizable with vinyl chloride, and
   (E) a saponified vinyl alkylcarboxylate, a rubbery binder, and a polyisocyanate.

5. A magnetic recording medium according to claim 4 wherein said copolymer is made, on the basis of the copolymer weight, from
   (A) 50 to 85% vinyl chloride,
   (B) 5 to 40% vinylidene chloride,
   (C) 5 to 40% vinyl alkylcarboxylate,
   (D) 1.0 to 5.0% other monomer copolymerizable with vinyl chloride, and
   (E) the balance of saponified vinyl alkylcarboxylate, all by weight.

6. A magnetic recording medium according to claim 4 or 5 wherein said rubbery binder is polyester resin, polyurethane resin, or a combination thereof.

* * * * *